Patented June 10, 1924.

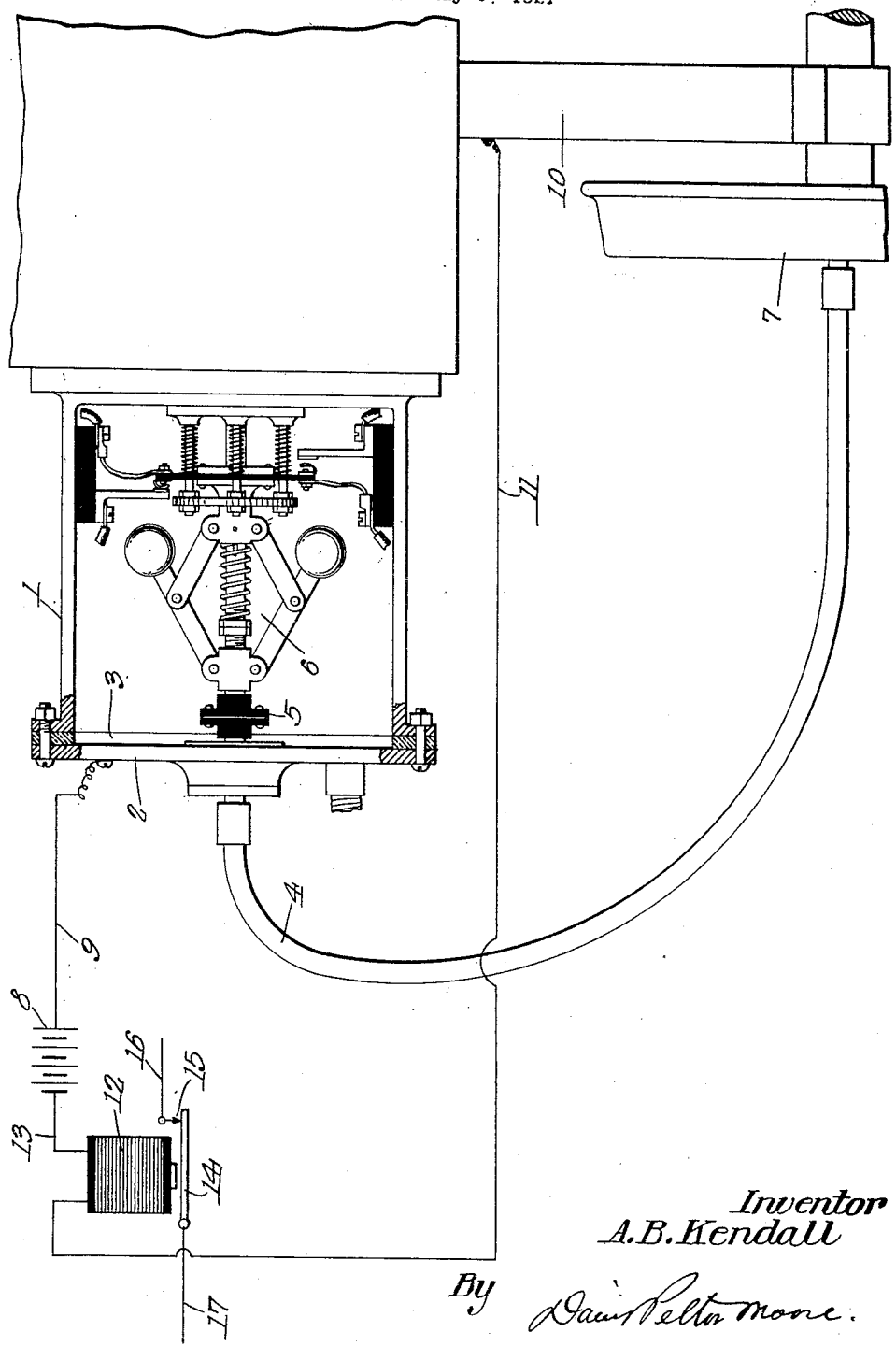

1,497,279

UNITED STATES PATENT OFFICE.

ALLEN B. KENDALL, OF MAYWOOD, ILLINOIS, ASSIGNOR TO REGAN SAFETY DEVICES COMPANY, INC., A CORPORATION OF NEW YORK.

DETECTING OR SAFETY DEVICE FOR SPEED-CONTROLLER CONNECTIONS.

Application filed May 5, 1921. Serial No. 467,072.

*To all whom it may concern:*

Be it known that I, ALLEN B. KENDALL, a citizen of the United States, residing at Maywood, in the county of Cook and State of Illinois, have invented certain new and useful Improvements in Detecting or Safety Devices for Speed-Controller Connections, of which the following is a specification, reference being had therein to the accompanying drawing.

This invention relates to improvements in train control apparatus, one object of the invention being the provision of a detecting means which will operate to bring the train to a halt automatically should the flexible shaft which comprises a speed circuit controller in the train control apparatus break.

With the foregoing and other objects in view which will appear as the description of the invention proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings is illustrated a diagram showing the complete apparatus, the speed circuit controller being shown partly in section and partly in elevation.

Referring to the drawings, the numeral 1 designates the casing of the speed circuit controller which is attached in any manner so desired to the frame 10 of the locomotive, the same being provided with a removable cap 2, insulated from the casing 1 by the disk 3 of insulation, and having properly mounted therein the flexible end of the flexible shaft 4 which is attached by the insulated coupling member 5, to the centrifugal governor device 6. The other end of the shaft is operably connected to the rotatable member 7 which is here shown as the wheel.

For detecting the integrity of the flexible shaft 4, I provide a circuit which includes the said shaft, the said circuit comprising the battery 8, the conductor 9, the insulated cap 2, the flexible shaft 4, the wheel 7 of the vehicle, the framework 10, the conductor 11, electromagnet 12, and conductor 13. By the provision of this means under normal vehicle conditions the electromagnet 12 is energized, energization of this magnet maintaining in operation a controlling circuit of a train control apparatus (not shown) here diagrammatically indicated as the armature 14 controlled by the electromagnet 12 and the contact 15 and conductors 16 and 17. The opening of the contact 15 may be made to operate any of the control apparatus, as shown for example in the copending application of Archibald G. Shaver, Ser. No. 292,548, filed April 25, 1919.

The operation of my detecting means will in the main be apparent from the above detailed description thereof. It will be seen that should the flexible shaft 4 break, that the circuit including the shaft will be opened, this in turn opening the train controlling circuit at the contact 15, and as shown in the copending case the opening of the contact will operate to vent the air brake system of the train for controlling the same.

What I claim as new is:

1. In combination, a speed controller insulatably mounted on the framework of a vehicle, a flexible shaft connecting the speed controller for operation by an element actuated by motion of the vehicle, and provisions for detecting the integrity of said flexible shaft comprising an electrical circuit embracing the said shaft, a source of electrical energy and a means for controlling the vehicle responsive to a break in said circuit.

2. In combination, a speed controller mounted on the framework of a vehicle, a flexible shaft connected thereto and insulated therefrom, the said shaft being connected to a wheel of the vehicle, and provisions for detecting the integrity of said flexible shaft comprising an electrical circuit embracing said shaft, a source of electrical energy and a means for controlling the vehicle responsive to a break in said circuit.

In testimony whereof I affix my signature.

ALLEN B. KENDALL.